US012695344B2

(12) United States Patent　　　　(10) Patent No.:　US 12,695,344 B2

Chamberlin et al.　　　　　　　　　(45) **Date of Patent:　*Jul. 28, 2026**

---

(54) HYBRID ROTOR MODULE WITH CLUTCH ASSEMBLIES AND COOLING OF ROTOR AND STATOR

(71) Applicant: BorgWarner Inc., Auburn Hills, MI (US)

(72) Inventors: Bradley Duane Chamberlin, Pendleton, IN (US); Sven Norbert Altlay, Friesenheim (DE); Jomon Kaniampalackal, Hockenheim (DE); Clemens Burger, Nobelsville, IN (US)

(73) Assignee: BORGWARNER INC., Auburn Hills, MI (US)

( * ) Notice: Subject to any disclaimer, the term of this patent is extended or adjusted under 35 U.S.C. 154(b) by 261 days.

This patent is subject to a terminal disclaimer.

(21) Appl. No.: 17/719,634

(22) Filed: Apr. 13, 2022

(65) Prior Publication Data

US 2022/0239174 A1　　Jul. 28, 2022

Related U.S. Application Data

(62) Division of application No. 15/496,820, filed on Apr. 25, 2017, now Pat. No. 11,336,138.

(Continued)

(51) Int. Cl.
　*H02K 1/32*　　　(2006.01)
　*H02K 1/2706*　　(2022.01)
　　　　(Continued)

(52) U.S. Cl.
　CPC ............. *H02K 1/32* (2013.01); *H02K 1/2706* (2013.01); *H02K 5/20* (2013.01); *H02K 5/203* (2021.01);
　　　　(Continued)

(58) Field of Classification Search
　CPC .. H02K 7/10; H02K 5/20; H02K 1/32; H02K 1/2706; H02K 21/14
　See application file for complete search history.

(56) References Cited

U.S. PATENT DOCUMENTS

| | | | |
|---|---|---|---|
| 4,926,105 A | 5/1990 | Mischenko et al. | |
| 6,371,267 B1 | 4/2002 | Kao et al. | |
| (Continued) | | | |

FOREIGN PATENT DOCUMENTS

| | | | | |
|---|---|---|---|---|
| CN | 101656445 A | 2/2010 | | |
| DE | 102013006857 A1 * | 10/2014 | ............... | H02K 1/32 |
| JP | 2009072052 A | 4/2009 | | |

OTHER PUBLICATIONS

Diekjakobs (DE 102013006857 A1) English Translation (Year: 2014).*

(Continued)

*Primary Examiner* — Tulsidas C Patel
*Assistant Examiner* — Robert E Mates
(74) *Attorney, Agent, or Firm* — CANTOR COLBURN LLP

(57) ABSTRACT

An electric machine includes a housing and a stator mounted to the housing. The stator includes a plurality of laminations, a first end turn and a second end turn. A rotor shaft extends through the housing. A hybrid rotor module is coupled to the rotor shaft. The hybrid rotor module includes a clutch basket including a rotor carrier having a first end, a second end, and an intermediate portion extending therebetween. The first end is radially outwardly offset relative to the second end. One or more clutch assemblies is arranged in the clutch basket. A rotor mounted to the rotor carrier. One or more openings is formed in the rotor carrier. The one or more openings direct coolant onto at least one of the stator, the first end turn, and the second end turn.

15 Claims, 3 Drawing Sheets

Related U.S. Application Data

(60) Provisional application No. 62/333,516, filed on May 9, 2016.

(51) Int. Cl.

| | |
|---|---|
| *H02K 5/20* | (2006.01) |
| *H02K 7/00* | (2006.01) |
| *H02K 7/10* | (2006.01) |
| *H02K 7/108* | (2006.01) |
| *H02K 9/19* | (2006.01) |
| *H02K 21/14* | (2006.01) |

(52) U.S. Cl.

CPC .............. *H02K 7/006* (2013.01); *H02K 7/10* (2013.01); *H02K 7/108* (2013.01); *H02K 9/19* (2013.01); *H02K 21/14* (2013.01)

(56) References Cited

U.S. PATENT DOCUMENTS

| | | | |
|---|---|---|---|
| 7,508,100 | B2 | 3/2009 | Foster |
| 9,528,436 | B2 | 12/2016 | Kasuya et al. |
| 9,636,990 | B2 | 5/2017 | Kasuya et al. |
| 9,906,103 | B2 | 2/2018 | Suzuki et al. |

| | | | | |
|---|---|---|---|---|
| 2005/0206248 | A1 | 9/2005 | Raszkowski et al. | |
| 2005/0206251 | A1* | 9/2005 | Foster | B60K 6/445 |
| | | | | 310/59 |
| 2009/0008212 | A1 | 1/2009 | Combes et al. | |
| 2010/0261575 | A1 | 10/2010 | Schoenek | |
| 2011/0138944 | A1 | 6/2011 | Mohlin et al. | |
| 2011/0240384 | A1 | 10/2011 | Roske et al. | |
| 2012/0075046 | A1 | 3/2012 | Hagiwara et al. | |
| 2012/0080248 | A1 | 4/2012 | Kasuya et al. | |
| 2013/0020889 | A1 | 1/2013 | Yamamoto et al. | |
| 2013/0213043 | A1* | 8/2013 | Kasuya | B60K 6/48 |
| | | | | 60/700 |
| 2015/0027273 | A1 | 1/2015 | Iwase et al. | |
| 2015/0239336 | A1* | 8/2015 | Kasuya | B60K 6/54 |
| | | | | 74/661 |
| 2016/0082825 | A1 | 3/2016 | Ruder | |
| 2017/0197502 | A1 | 7/2017 | Yukishima et al. | |
| 2017/0324290 | A1 | 11/2017 | Chamberlin et al. | |

OTHER PUBLICATIONS

International Search Report and Written Opinion for International Application No. PCT/US2017/030775; International Filing Date May 3, 2017; Report Mail Date Aug. 11, 2017 (pp. 1-11).

* cited by examiner

HYBRID ROTOR MODULE WITH CLUTCH ASSEMBLIES AND COOLING OF ROTOR AND STATOR

CROSS-REFERENCE TO RELATED APPLICATIONS

The present application is a Divisional application which claims priority to U.S. Non-Provisional application Ser. No. 15/496,820, filed Apr. 25, 2017, which claims the benefit of U.S. Provisional Application No. 62/333,516, filed on May 9, 2016, the contents of which are incorporated herein by reference in their entirety.

BACKGROUND OF THE INVENTION

Exemplary embodiments pertain to the art of electric motors, and more particularly, to a cooling system for an electric motor having a hybrid rotor module.

During operation, electrical energy flow develops heat in rotor and stator portions of an electric motor. Hybrid electric motors may develop additional heat through operation of one or more clutches. Heat can reduce operational performance and an overall operational life of an electric machine. In order to reduce heat build up, coolant is typically passed through the electric motor. Coolant may take the form of a fluid such as air, water or oil.

BRIEF DESCRIPTION OF THE INVENTION

Disclosed is an electric machine including a housing and a stator mounted to the housing. The stator includes a plurality of laminations, a first end turn and a second end turn. A rotor shaft extends through the housing. A hybrid rotor module is coupled to the rotor shaft. The hybrid rotor module includes a clutch basket including a rotor carrier having a first end, a second end, and an intermediate portion extending therebetween. The first end is radially outwardly offset relative to the second end. One or more clutch assemblies is arranged in the clutch basket. A rotor mounted to the rotor carrier. One or more openings is formed in the rotor carrier. The one or more openings direct coolant onto at least one of the stator, the first end turn, and the second end turn.

Also disclosed is a method of cooling a hybrid rotor module of an electric machine includes guiding a volume of coolant into a clutch basket of the hybrid rotor module. The clutch basket includes a first end that is radially outwardly offset relative to a second end. The method also includes passing at least a portion of the volume of coolant to at least one clutch assembly arranged in the clutch basket, directing at least some of the portion of the volume of coolant through a rotor carrier of the clutch basket, and flinging the at least some of the portion of the volume of coolant onto at least one end turn of a stator of the electric machine.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
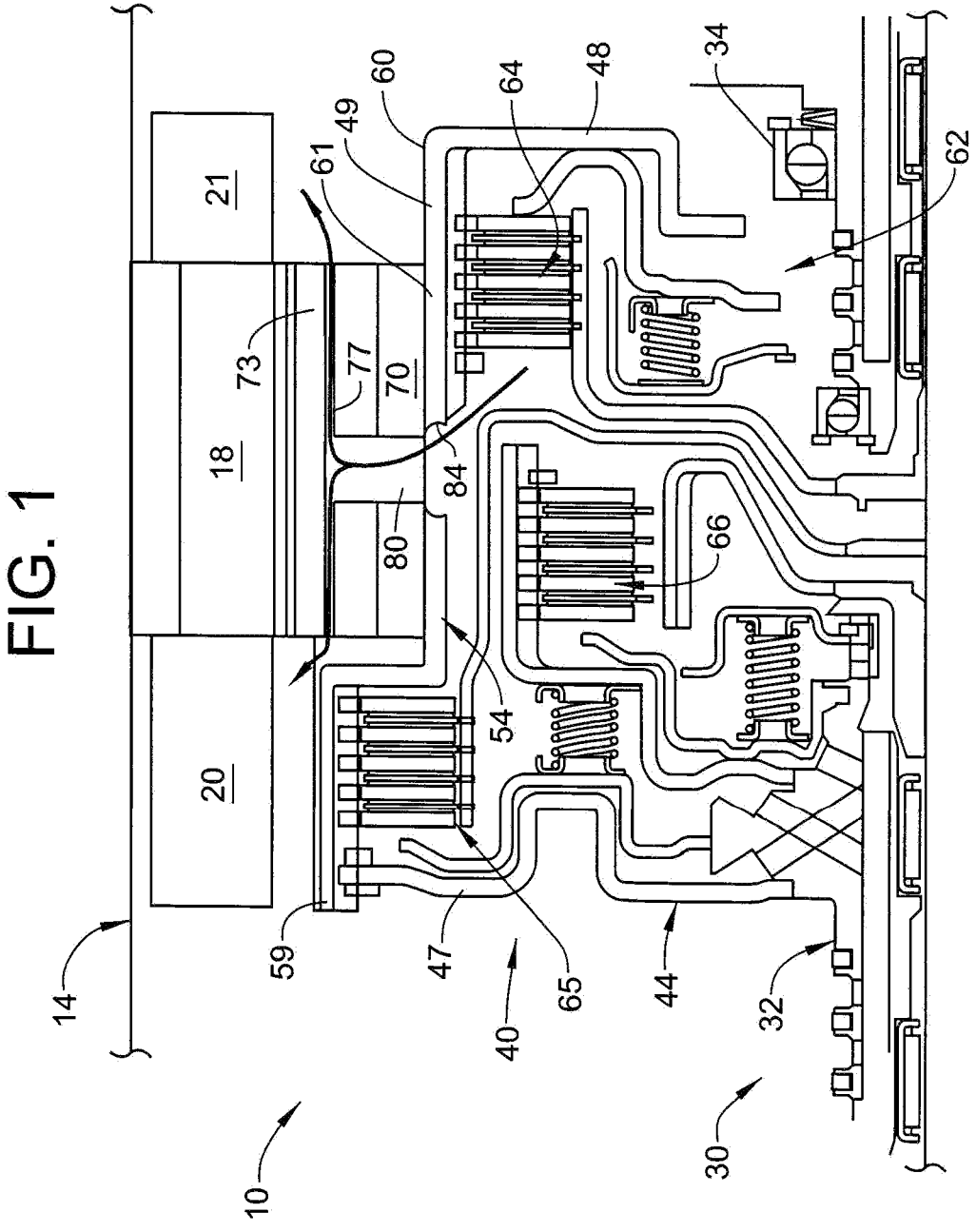
FIG. 1 depicts a portion of an electric machine having a hybrid rotor module, in accordance with an aspect of an exemplary embodiment.

An electric machine, in accordance with an aspect of an exemplary embodiment, is illustrated generally at 10 in FIG. 1. Electric machine 10 includes a housing 14 supporting a stator 18 having a first end turn 20 and a second end turn 21. It is to be understood that housing 14 may not directly support stator 18. For example, stator 18 could be supported by intermediate structure arranged within housing 14. A rotor shaft 30 extends through housing 14. Rotor shaft 30 includes an outer surface 32 and may be rotatably supported in housing 14 through a plurality of bearings, one of which is indicated at 34.

Electric machine 10 includes a hybrid rotor module 40 operatively coupled to rotor shaft 30. Hybrid rotor module 40 includes a clutch basket 44 defined by a first member 47, a second member 48 and a third member 49. It is to be understood that first, second and third members 47-49 may be individual components, multiple components, or may be formed as a unitary structure. First and second members 47 and 48 extend radially outwardly of outer surface 32 and are joined by third member 49. In this manner, third member 49 defines a rotor carrier 54. In the exemplary embodiment shown, rotor carrier 54 includes a first end 59, a second end 60, and an intermediate portion 61 extending therebetween. First end 59 is radially offset relative to second end 60.

First, second and third members 47-49 define an interior portion 62 housing a first clutch assembly 64, a second clutch assembly 65 and a third clutch assembly 66. First clutch assembly 64 may be operable to engage an internal combustion engine (not shown). Second and third clutch assemblies 65 and 66 may be operable to engage a dual clutch transmission. For example, second clutch assembly 65 may be associated with engaging a first gear set (not shown) and third clutch assembly 66 may be associated with engaging a second gear set (also not shown). Thus, in accordance with an exemplary aspect, electric machine 10 may form part of a hybrid electric drive system for a vehicle.

A rotor 70 is mounted to rotor carrier 54. Rotor 70 may include a plurality of laminations (not separately labeled) and is rotated relative to stator 18 to develop an electrical current. In the exemplary embodiment shown, rotor 70 may include a magnet 73. Magnet 73 may be positioned within rotor 70 so as to define an interior permanent magnet (IPM) rotor, or may be positioned radially outwardly of rotor 70 so as to define a surface permanent magnet (SPM) rotor. It is to be understood that rotor 70 may take the form of an aluminum induction rotor or a copper induction rotor. A coolant passage 77 may extend between rotor 70 and magnet 73. Coolant passage 77 is fluidically connected with a channel 80 extending radially through rotor 70. Channel 80 registers with an opening 84 formed in rotor carrier 54. Opening 84 fluidically connects interior portion 62 with coolant passage 77. It is to be understood that the number of openings 84, channels 80 and coolant passages 77 may vary. For example, a number of openings 84, channels 80 and coolant passages 77 may extend annularly about rotor 70 and rotor carrier 54.

A volume of coolant, such as oil, is passed into interior portion 62. A portion of the volume of coolant may pass over one or more of first, second and third clutch assemblies 64-66. Some of the coolant passing over the one or more of first, second and third clutch assemblies 64-66 and/or another portion of the volume of coolant passes through opening 84 into channel 80. The coolant flows through coolant passage 77 in a heat exchange relationship with rotor 70 and/or with magnet 73 if so provided. The coolant may then pass from coolant passage 77 via opposing outlets (not separately labeled) and is flung, by for example, centrifugal force, onto first end turn 20 and second end turn 21 providing additional cooling benefits. The coolant may then pass to a drain, through a heat exchanger, and then be redirected back into interior portion 62.

Figure 2:
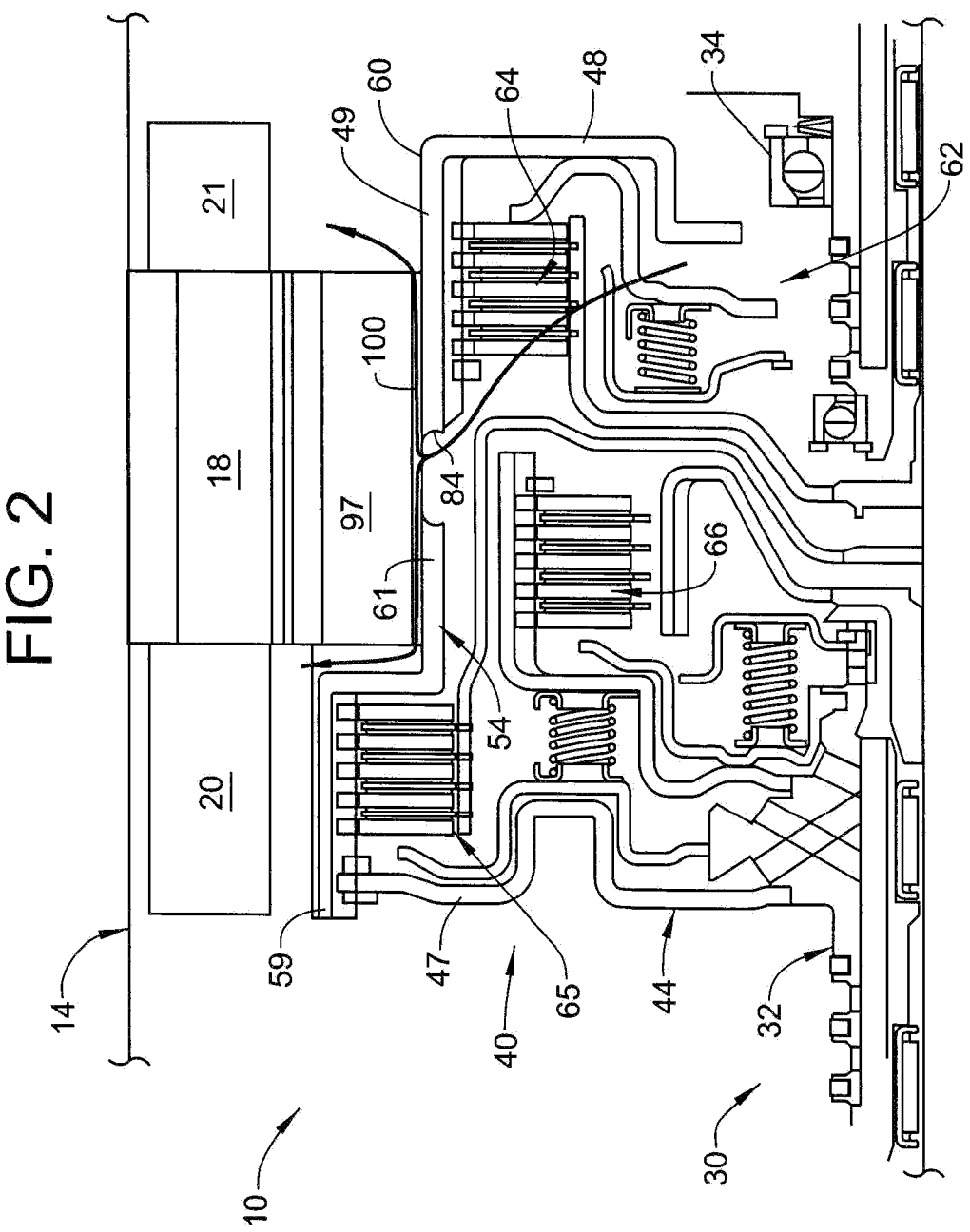
FIG. 2 depicts a portion of an electric machine having a hybrid rotor module, in accordance with another aspect of an exemplary embodiment.

Reference will now follow to FIG. 2, wherein like reference numbers represent corresponding parts in the respective views, in describing a rotor 97 in accordance with another aspect of an exemplary embodiment. Rotor 97 is coupled to rotor carrier 54. A coolant passage 100 extends axially between rotor 97 and rotor carrier 54. Coolant passage 100 is fluidically connected to interior portion 62 via opening 84. In this manner, coolant may flow from interior portion 62 into coolant passage 100 and pass, in a heat exchange relationship, through rotor 97. The coolant may then pass from coolant passage 100 via opposing outlets (not separately labeled) and be flung radially outwardly from coolant passage 100 onto first end turn 20 and second end turn 21 providing additional cooling benefits.

Figure 3:
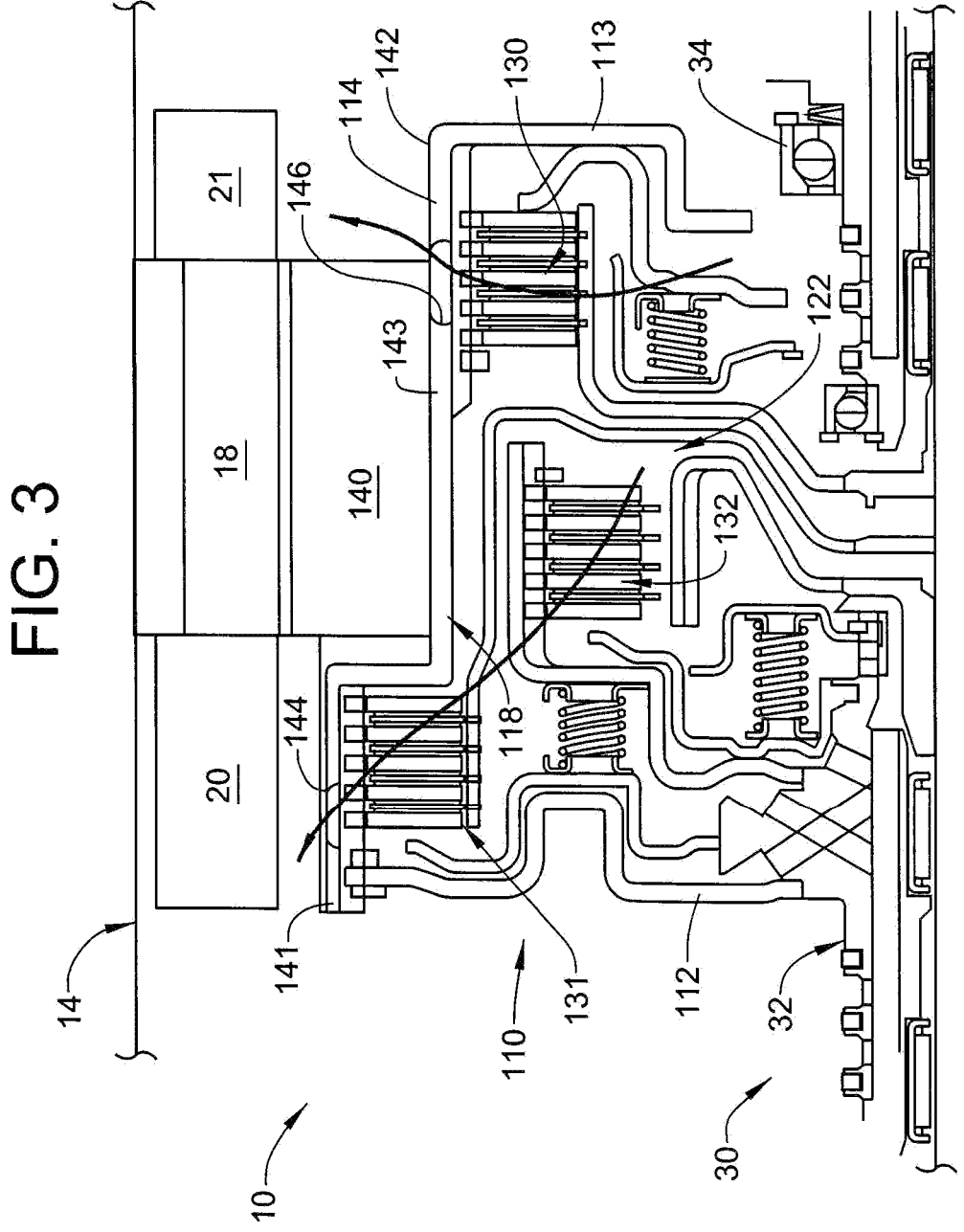
FIG. 3 depicts a portion of an electric machine having a hybrid rotor module, in accordance with yet another aspect of an exemplary embodiment.

Reference will now follow to FIG. 3, wherein like reference numbers represent corresponding parts in the respective views, in describing a clutch basket 110 in accordance with an aspect of an exemplary embodiment. Clutch basket 110 includes a first member 112, a second member 113 and a third member 114. It is to be understood that first, second and third members 112-114 may be individual components, multiple components, or may be formed as a unitary structure. First and second members 112 and 113 extend radially outwardly of outer surface 32 and are joined by third member 114. In this manner, third member 114 defines a rotor carrier 118.

First, second and third members 112-114 define an interior portion 122 housing a first clutch assembly 130, a second clutch assembly 131 and a third clutch assembly 132. First clutch assembly 130 may be operable to engage an internal combustion engine (not shown). Second and third clutch assemblies 131 and 132 may be operable to engage a dual clutch transmission. For example, second clutch assembly 131 may be associated with engaging a first gear set (not shown) and third clutch assembly 132 may be associated with engaging a second gear set (also not shown).

In accordance with an aspect of an exemplary embodiment, a rotor 140 is mounted to rotor carrier 118. Rotor 140 is rotated relative to stator 18 to develop an electrical current. In the exemplary embodiment shown, rotor carrier 118 includes a first end 141, a second end 142, and an intermediate portion 143 extending therebetween. First end 141 is radially offset relative to second end 142 and includes a first opening 144. Second end 142 includes a second opening 146. First opening 144 is arranged near second clutch assembly 131 and second opening 146 is arranged near first clutch assembly 130. It is to be understood that the location and number of openings formed in rotor carrier 118 may vary.

In this manner, a portion of the coolant flowing through interior portion 122 may pass over second clutch assembly 131, flow through first opening 144 axially outwardly of rotor 140 and be flung radially outwardly onto first end turn 20. Similarly, another portion of the coolant flowing through interior portion 122 may pass over first clutch assembly 130, flow through second opening 146 axially outwardly of rotor 140 and be flung radially outwardly onto second end turn 21. The coolant may also flow in a heat exchange relationship with rotor 140 prior to being distributed to stator 18 and/or first and second end turns 20 and/or 21.

It is to be understood that exemplary embodiments describe systems for proving cooling to components of an electric machine including a hybrid rotor module. Coolant is passed into the hybrid rotor module in a heat exchange relationship with one or more clutch assemblies. The coolant is then passed out from the hybrid rotor module and flung, radially outwardly, onto a stator and/or stator end turns to provide additional cooling benefits. The coolant may pass in a heat exchange relationship with a rotor prior to being distributed to the stator and/or stator end turns.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An electric machine comprising:
   a housing;
   a stator mounted to the housing, the stator including a plurality of laminations, a first end turn and a second end turn, wherein the plurality of laminations includes an axial midpoint, a stator first end located to one side of the axial midpoint and a stator second end located to the opposite side of the axial midpoint;
   a rotor shaft extending through the housing;
   a hybrid rotor module coupled to the rotor shaft, the hybrid rotor module comprising:
      a clutch basket including a rotor carrier having a first end, a second end, and an intermediate portion extending therebetween;
      at least a first clutch assembly arranged at the stator first end, a second clutch assembly arranged at the stator second end and a third clutch assembly arranged between the first stator end and second stator end, wherein the second and third clutch assembly are axially offset such that the second and third clutch assembly are defined by a lack of radial overlap;
      a rotor mounted to the rotor carrier, the rotor having a first rotor end and a second rotor end; and a first opening extending radially through the rotor carrier at a first end and a second opening extending radially through the rotor carrier at a second end of the rotor carrier, the first opening directing a first portion of coolant at the first end turn and the second opening directing a second portion of coolant at the second end turn, the first opening directing coolant from the second clutch assembly, to be flung radially outwardly onto the first end turn and the second opening directing coolant from the first clutch assembly, to be flung onto the second end turn, and further directing coolant from the third clutch assembly to the second clutch assembly, wherein directing coolant from the third clutch assembly to the second clutch assembly includes directing the coolant in an at least partially axial direction from the third clutch assembly to the second clutch assembly.

2. The electric machine according to claim 1, wherein one of the one or more openings is arranged axially outwardly of the rotor.

3. The electric machine according to claim 1, wherein the coolant comprises oil.

4. The electric machine according to claim 1, wherein the rotor comprises one of an aluminum induction rotor and a copper induction rotor.

5. The electric machine according to claim 1, wherein the second opening is partially covered by the rotor.

6. The electric machine of claim 1, wherein, the first end of the clutch basket is radially outwardly offset relative to the second end of the clutch basket.

7. The electric machine of claim 1, wherein the rotor carrier extends axially beyond the second rotor end.

8. The electric machine of claim 2, wherein one opening is arranged axially outward of the rotor and one opening is arranged at least partially outward of the rotor.

9. The electric machine of claim 1, wherein the second clutch assembly is located completely axially beyond the rotor and the first clutch assembly is located at least partially axially beyond the rotor.

10. A method of cooling a hybrid rotor module of an electric machine comprising:

guiding a volume of coolant into a clutch basket of the hybrid rotor module, the clutch basket including a first end that is radially outwardly offset relative to a second end;

directing at least some of the portion of the volume of coolant through a rotor carrier of the clutch basket;

passing at least a first portion of the volume of coolant over a third clutch assembly, passing the at least the first portion of the volume of coolant from the third clutch assembly to the second clutch assembly along an at least partially axial flowpath, and then over a second clutch assembly, then through a first opening in the rotor carrier, the first opening extending radially through the rotor carrier at a first end and flinging the at least a first portion of the volume of coolant radially outwardly onto a first end turn of a stator of the electric machine;

passing a second portion of the volume of coolant over a first clutch assembly, then through a second opening extending radially through the rotor carrier at a second end and flinging radially outwardly on a second end turn of the stator; and wherein the second and third clutch assemblies are axially offset such that the second and third clutch assemblies are defined by a lack of radial overlap.

11. The method of claim 10, wherein directing the at least some of the volume of coolant through the rotor carrier includes passing the at least some of the volume of coolant through an opening disposed at least partially axially outwardly of a rotor mounted to the rotor carrier.

12. The method of claim 10, flinging the at least some of the portion of the volume of coolant onto the at least one end includes passing the at least some of the portion of the volume of coolant in a heat exchange relationship with a rotor mounted to the rotor carrier.

13. The method of claim 12, wherein passing the at least some of the portion of the volume of coolant in a heat exchange relationship with the rotor includes passing the at least some of the portion of the volume of coolant axially outwardly of the rotor.

14. The method of claim 10, wherein directing the at least some of the volume of coolant through the rotor carrier includes passing the at least some of the volume of coolant along a surface of a rotor mounted to the rotor carrier.

15. An electric machine comprising:

a housing;

a stator mounted to the housing, the stator including a plurality of laminations, a first end turn and a second end turn, wherein the plurality of laminations includes an axial midpoint, a stator first end located to one side of the axial midpoint and a stator second end located to the opposite side of the axial midpoint;

a rotor shaft extending through the housing;

a hybrid rotor module coupled to the rotor shaft, the hybrid rotor module comprising:

a clutch basket including a rotor carrier having a first end, a second end, and an intermediate portion extending therebetween, the intermediate portion including a radial subportion, the first end being radially outwardly offset relative to the second end;

one or more clutch assemblies arranged in the clutch basket, the one or more clutch assemblies including at least a first clutch assembly arranged at the stator first end, a second clutch assembly arranged at the stator second end and a third clutch assembly arranged between the first stator end and second stator end, wherein the second and third clutch assemblies are axially offset such that the second and third clutch assemblies are defined by a lack of radial overlap;

a rotor mounted to the rotor carrier, in spaced relationship to the radial subportion of the intermediate portion; and a first opening extending radially through the rotor carrier at a first end of the rotor carrier and a second opening extending radially through the rotor carrier at a second end of the rotor carrier, the one or more openings directing coolant onto at least one of the stator, the first end turn, and the second end turn.

* * * * *